(12) United States Patent
Fasse et al.

(10) Patent No.: US 8,531,657 B2
(45) Date of Patent: Sep. 10, 2013

(54) MICRO-RADIAN CLASS LINE OF SIGHT AND CENTRATION STABILIZATION SYSTEM

(75) Inventors: Ernest Dean Fasse, Tucson, AZ (US); Frederick B. Koehler, Tucson, AZ (US); Peter Val Messina, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 175 days.

(21) Appl. No.: 13/233,225

(22) Filed: Sep. 15, 2011

(65) Prior Publication Data

US 2013/0070238 A1 Mar. 21, 2013

(51) Int. Cl.
*G01B 11/26* (2006.01)

(52) U.S. Cl.
USPC .. 356/139.04; 356/138; 356/153; 356/139.08

(58) Field of Classification Search
USPC ................ 356/138, 139.03–139.06, 153, 399
See application file for complete search history.

(56) References Cited

U.S. PATENT DOCUMENTS

| 6,020,955 | A | 2/2000 | Messina |
| 6,288,381 | B1 * | 9/2001 | Messina ................ 250/201.1 |
| 6,737,664 | B2 * | 5/2004 | Bretney et al. ............ 250/559.3 |
| 6,792,369 | B2 * | 9/2004 | Messina .................... 702/94 |
| 7,679,733 | B2 * | 3/2010 | Carter et al. ............. 356/139.03 |

OTHER PUBLICATIONS

Optics in Motion, "Beam Stabilizer", (Oct. 15, 2006).
Zhou, Qingkun, et al., "Design and Analysis of a Fast Steering Mirror for Precision Laser Beams Steering", Sensors & Transducers Journal, vol. 5, Special Issue, Mar. 2009, pp. 104-118, (Mar. 23, 2009).

\* cited by examiner

*Primary Examiner* — Layla Lauchman
(74) *Attorney, Agent, or Firm* — Schwegman Lundberg & Woessner, P.A.

(57) ABSTRACT

This document discusses apparatus and methods for aligning and centering an articulated laser projection system. In an example, a laser projection system can include an alignment stabilization system configured to align an optical path to a reference and a centration stabilization system configured to center the optical path within an aperture. The alignment stabilization system can have an alignment stabilization processing path configured to receive alignment information from an alignment sensor, and the centration stabilization system can have a centration stabilization processing path configured to receive centration information from a centration sensor.

23 Claims, 4 Drawing Sheets

MICRO-RADIAN CLASS LINE OF SIGHT AND CENTRATION STABILIZATION SYSTEM

TECHNICAL FIELD

This document pertains generally, but not by way of limitation, to laser projection and more particularly to apparatus and methods for alignment and centration of micro-radian class line-of-sight (LOS) quality laser projection systems.

BACKGROUND

Laser projection systems in combination with systems for imaging, target designating and range finding can provide accurate information about particular details within view of such a system combination. In civilian use, a combined laser projection system can be used to locate personnel during search and rescue operations. In military use, a combined laser projection system can be used to accurately identify and target an enemy threat as well as target the threat for weapons systems. Accuracy of such a system can be influenced by how well the laser projection system is aligned with the field of view of, for example, a corresponding imaging system. Efficiency of the system can be influenced by how well centered each emission source is with apertures used to couple the optical paths of the combined systems. In certain examples, the optical path can receive light from the field as well as project light to the field from a system emission source, such as laser light, of the laser projection system or other systems combined with the laser projection system. Messina, U.S. Pat. No. 6,020,955, the entire disclosure of which is hereby incorporated by reference herein in its entirety, relates to a system that can provide LOS alignment and stabilization of off-gimbal electro-optical and active sensors.

OVERVIEW

In accordance with certain examples, apparatus and methods for aligning and centering a laser projection system are described herein. In an example, a laser projection system can include an alignment stabilization system configured to align an optical path to a reference, such as a field of view when used with an imaging system, or a mechanical reference for other systems, and a centration stabilization system configured to center the optical path within an aperture. The alignment stabilization system can have an alignment stabilization processing path configured to receive alignment information from an alignment sensor, and the centration stabilization system can have a centration stabilization processing path configured to receive centration information from a centration sensor. In an example, the alignment stabilization processing path can be separate from the centration stabilization processing path.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
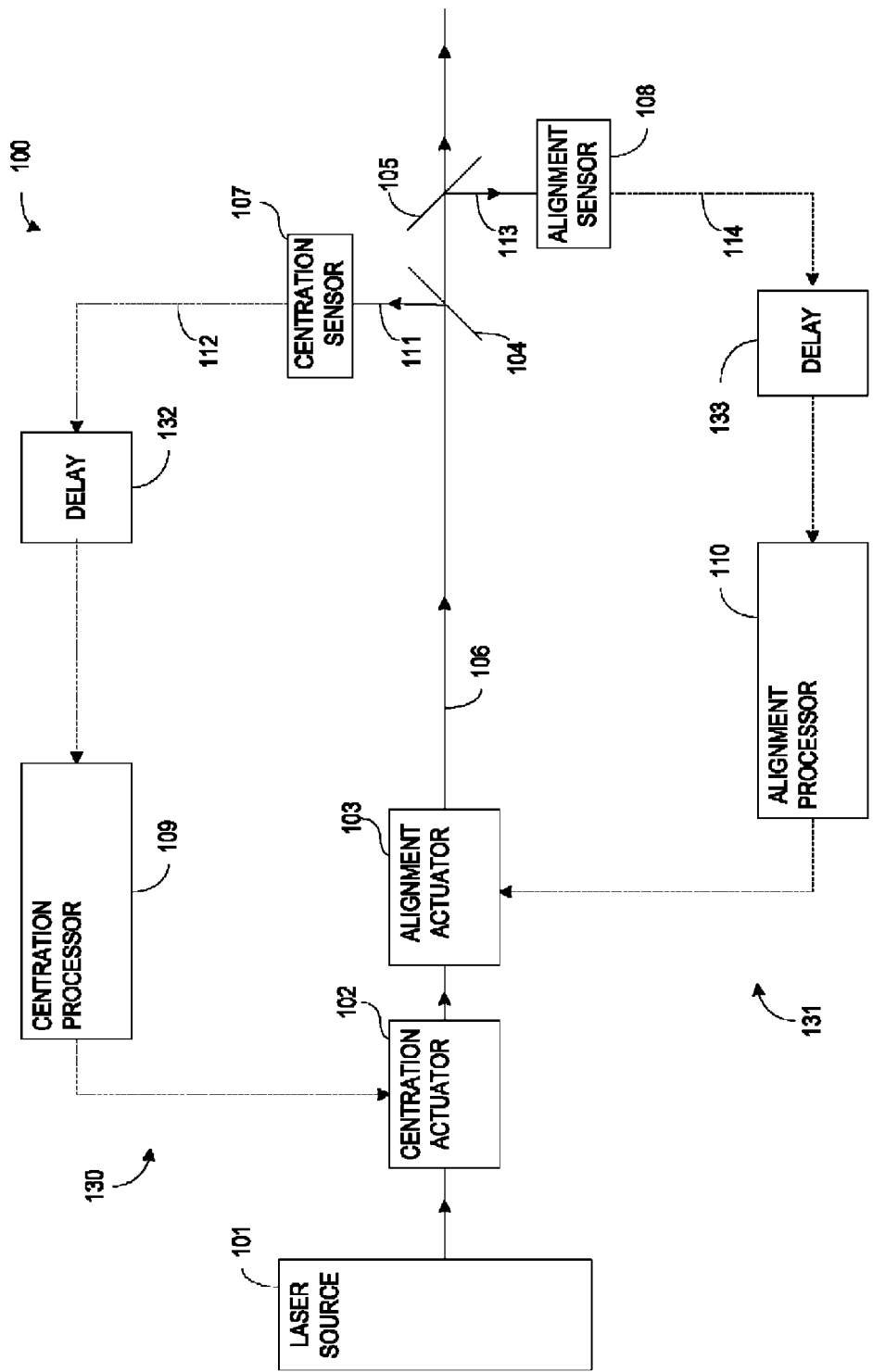
FIG. 1 illustrates generally an example laser projection system with separate alignment stabilization and centration stabilization processing paths.

The present inventors have recognized, among other things, apparatus and methods for aligning and centering a laser projection system. In certain examples, a laser projection system can be used in combination with sensors of other systems to provide line of sight imaging solutions such as range finding, target designation, active imaging, etc. In some systems, a laser projection device, emits a beam of energy, such as laser energy, to illuminate at least a portion of a field of regard. Sensors can detect laser light reflected from a field of view within the field of regard. Analysis of the reflected laser light can provide information about the field of view such as the range and direction of a particular object that reflected the laser light. In some systems, the laser projection system can illuminate a target in the field of view, such as to provide a target for a corresponding weapon system, wherein the point of reflection can be used to guide the weapon.

Many factors can influence the performance of the system. Angular alignment of the laser to the sensor field of view can be one factor that can influence performance, such as accuracy, of a combined system including the laser projection system. Some laser projection devices are designed to work over long distances such as a mile or more. In an example, if a laser of an active imaging system is misaligned, the misalignment can result in a portion of the field of view of the associated imaging system being poorly illuminated or not illuminated at all. In an example, angular misalignment of the optical path of the laser can result in designation of an incorrect object. Centration can be another factor that can influence performance, such as efficiency, of a combined system including the laser projection system. In certain examples, the projected laser energy can pass through one or more apertures in a system. Positional misalignment of the optical path of the laser with the apertures (decentration) can decrease the energetic efficiency of the laser projection system.

In certain examples, angular alignment information and positional centration information can be processed separately. In some examples, an alignment stabilization method can include receiving an alignment laser emission at an alignment sensor, receiving alignment information (e.g., angular alignment information) from the alignment sensor at an alignment processor, processing the alignment information to provide an alignment error, and adjusting an alignment actuator, such as an actuated mirror, to compensate for the alignment error. In some examples, centration stabilization is processed through a processing path that is separate from the processing path of alignment stabilization. In an example, a centration stabilization method can include receiving a centration alignment laser emission at a centration sensor, receiving centration information (e.g., position information) from the centration sensor at a centration processor, processing the centration information to provide a centration error, and adjusting a centration actuator, such as an actuated mirror, to compensate for the centration error.

FIG. 1 illustrates generally an example of a laser projection system 100 with separate alignment stabilization and centration stabilization processing paths. In certain examples, the laser projection system 100 can include a laser source 101, a centration actuator 102, an alignment actuator 103, optics 104, 105 to separate at least a portion of a laser emission from a main optical path 106, a centration sensor 107, an alignment sensor 108, a centration processor 109, and an alignment processor 110. In certain embodiments, the laser source 101 can include one or more lasers. In certain examples, the laser source 101 can include lasers that can project laser light having different wavelengths including, but not limited to, infrared (IR) laser light, visible laser light, etc. In an example, a centration stabilization processing path 130 can include the centration sensor 107, the centration processor 109, the centration actuator 102, and the communication paths between the centration processor 109 and the centration actuator 102 and sensor 107. In an example, an alignment stabilization processing path 131 can include the alignment sensor 108, the alignment processor 110, the alignment actuator 103, and the communication paths between the alignment processor 110 and the alignment actuator 103 and sensor 108. Each stabilization processing path 130, 131 can include latencies, or delays 132, 133, such as communication delays, processing delays, or response delays of the sensor 107, 108 or actuator 102, 103. The delays 132, 133 can affect the control bandwidth of each stabilization processing path 130, 131. It is understood that actual delays can be located or distributed throughout the processing paths of the system, however, the delays 132, 133 are represented as discrete components in the example system of FIG. 1.

In certain examples, the laser source 101 can include more than one laser. In an example, a laser of the laser source 101 can be dedicated to angular alignment stabilization of the optical path 106 of one or more lasers. In an example, a laser of the laser source 101 can be dedicated to positional centration stabilization of the optical path 106 of one or more lasers. In an example, a single laser of the laser source 101 can be dedicated to alignment and centration stabilization. The optical path 106 for laser emissions can include a number of optical components to combine laser emissions, focus one or more laser emissions, direct one or more laser emissions, separate one or more laser emissions, or shape one or more laser emissions.

In an example, a centration stabilization system can include centration optics 104 to separate a particular laser emission 111 from a combination of laser emissions. In an example, the separated laser emission 111 can be directed to a centration sensor 107 by the centration optics 104. In an example, a centration stabilization system can include centration optics 104 to separate a portion of a laser emission. In an example, the portion of laser emission can be directed to a centration sensor 107 by the centration optics 104. The centration sensor 107 can include a two-dimensional detector and processing electronics to provide centration information about a detected laser emission. In an example, the centration sensor can provide information, centration information 112, about the location of the emission beam at the centration sensor 107. The centration information 112 can be an analog signal or a digital signal. In certain examples, a centration sensor 107 can include, but is not limited to, a lateral effect cell, a photodiode type sensor, such as a quad sensor. In certain examples, the centration information 112 can provide an indication of how well the optical path 106 of the laser(s) is centered in one or more apertures (not shown) of the system. For example, a laser path, such as for a targeting laser or a range finding laser, can pass through an aperture of optics that allow an imaging optical path to be directed to an imaging sensor. The aperture can be small to minimize reduction of energy transmitted from the field of view to the imaging sensor. In certain examples, the centration stabilization system can reduce the chance that at least a portion of the laser beam or optical path does not clear the aperture. Although a properly initialized system can center the laser optical path through one or more apertures, changes in the operating conditions of the system can disrupt the centration of the laser optical path. Such conditions can include slowly varying disruptions, such as thermal disruptions, as well as quick disruptions, such as mechanical vibration.

In an example, the centration information 112 can be received from the centration sensor 107 at a centration processor 109. In an example, the centration processor 109 can include a digital signal processor. In an example, the centration processor 109 can include a field programmable gate array. In certain examples, the centration processor 109 can include analog components, digital components, firmware, or combinations thereof. The centration processor 109 can compare the centration information 112 to centration reference information and can provide a compensation signal indicative of centration error. The centration error can be processed to command a centration actuator 102 to position the optical path 106 of the laser beam so as to minimize the centration error. In certain examples, the centration actuator 102 can include, but is not limited to, a steering mirror, an actuated prism, or an actuated lens having optical power. In certain examples, the centration actuator 102 can include a flexure-suspended, two-axis, voice coil mirror.

In an example, an alignment stabilization system can include alignment optics 105 to separate a particular laser emission 113 from a combination of laser emissions. In an example, the particular laser emission 113 can be directed to an alignment sensor 108 by the alignment optics 105. In an example, the alignment stabilization system can include alignment optics 105 to separate a portion of a laser emission. In an example, the portion of laser emission can be directed to an alignment sensor 108 by the alignment optics 105. In certain examples, the alignment sensor 108 can include a two-dimensional detector and processing electronics to provide alignment information about a detected laser emission. In an example, the alignment sensor 108 can provide information, alignment information 114, about the direction of the emission beam 113 at the alignment sensor 108. The alignment information 114 can be an analog signal or a digital signal. In certain examples, the alignment sensor 108 can include, but is not limited to, a lateral effect cell or a photodiode type sensor, such as a quad sensor. In certain examples, the angular alignment information 114 of the optical path 106 can provide an indication of how well the optical path 106 of the laser(s) is aligned with the field of view of the overall system. For example, a laser optical path, such as for a range finding laser, can provide very accurate targeting and ranging information when the optical path of the designation laser or the ranging laser aligns with the optical path of the corresponding imaging system. In another example, a laser optical path, such as for a target designation laser, can project a spot accurately with respect to an imaging system when the optical path of the target designation laser aligns with the optical path of the imaging system. In certain examples, the designation spot need not be visible to the imaging system. Although a properly initialized system can provide an aligned optical path 106, changes in the operating conditions of the system can disrupt the angular alignment of the optical path 106.

Such conditions include slowly varying conditions such as thermal disruptions as well as quick disruptions such as mechanical vibration.

In an example, the alignment information 114 can be received from the alignment sensor 108 at an alignment processor 110. In an example, the alignment processor 110 can include a digital signal processor. In an example, the alignment processor 110 can include a field programmable gate array. In certain examples, the alignment processor 110 can include analog components, digital components, firmware, or combinations thereof. The alignment processor 110 can compare the alignment information 114 to alignment reference information and can provide a compensation signal indicative of an angular alignment error. The angular alignment error can be processed to command an alignment actuator 103 to direct the laser beam so as to minimize the angular alignment error. In certain examples, the alignment actuator 103 can include, but is not limited to, a steering mirror, an actuated prism, or an actuated lens having optical power. In certain examples, the alignment actuator 103 can include a flexure-suspended, two-axis, voice coil mirror or a steering mirror having a closed-loop bandwidth of about 4 kHz to 5 kHz or higher. In certain examples, a single programmable gate array can be used to execute both the alignment stabilization and the centration stabilization processing paths.

In certain examples, centration and alignment, e.g. angular alignment, can be stabilized simultaneously using separate control loops. In an example, the control bandwidth of the alignment stabilization processing path can be greater than the bandwidth of the centration stabilization processing path. In an example, the control bandwidth of the centration stabilization processing path can be greater than the bandwidth of the alignment stabilization processing path. In an example, the bandwidth of one of the alignment or centration processing paths can be about ten times higher than the bandwidth of the other stabilization processing path. FIG. 1 illustrates generally one example of centration and alignment stabilization systems having separate stabilization processing paths. In some examples, the locations of the centration actuator 102 and centration sensor 107 can be swapped. In some examples, the locations of the centration actuator 102 and centration sensor 107 can be swapped with the locations of the alignment actuator 103 and the alignment sensor 108, respectively. In an example, the direction for the optical path 106 of the alignment stabilization system can be opposite that shown in FIG. 1. In an example, the direction of the optical path 106 of the centration stabilization system can be opposite that shown in FIG. 1. In some examples, the centration and alignment stabilization systems can include a single laser source. In certain examples, the path of the emission source energy of one or both of the centration and alignment stabilization systems can double back along the optical path such that the emission source and the corresponding stabilization sensor can be co-located or located proximate to each other.

In certain examples, laser source power can be controlled to maintain a constant signal to noise ratio at the alignment sensor 108 or the centration sensor 107. In such systems, a control loop, such as a power control loop, can be dedicated to receiving information about the power received at the alignment sensor, the centration sensor, or both the alignment and centration sensors. The control loop can compare the received power to a target reception power and can modulate the power of the alignment laser, the centration laser, or the alignment laser and the centration laser using the comparison to maintain the target power reception and a substantially constant signal to noise ratio. Conditions that can effect power reception at the sensors can include, but are not limited to, cleanliness of the optical components, relative movement of system components, such as via gimbal movement, replacement of components, changes in polarization of components, etc.

Figure 2:
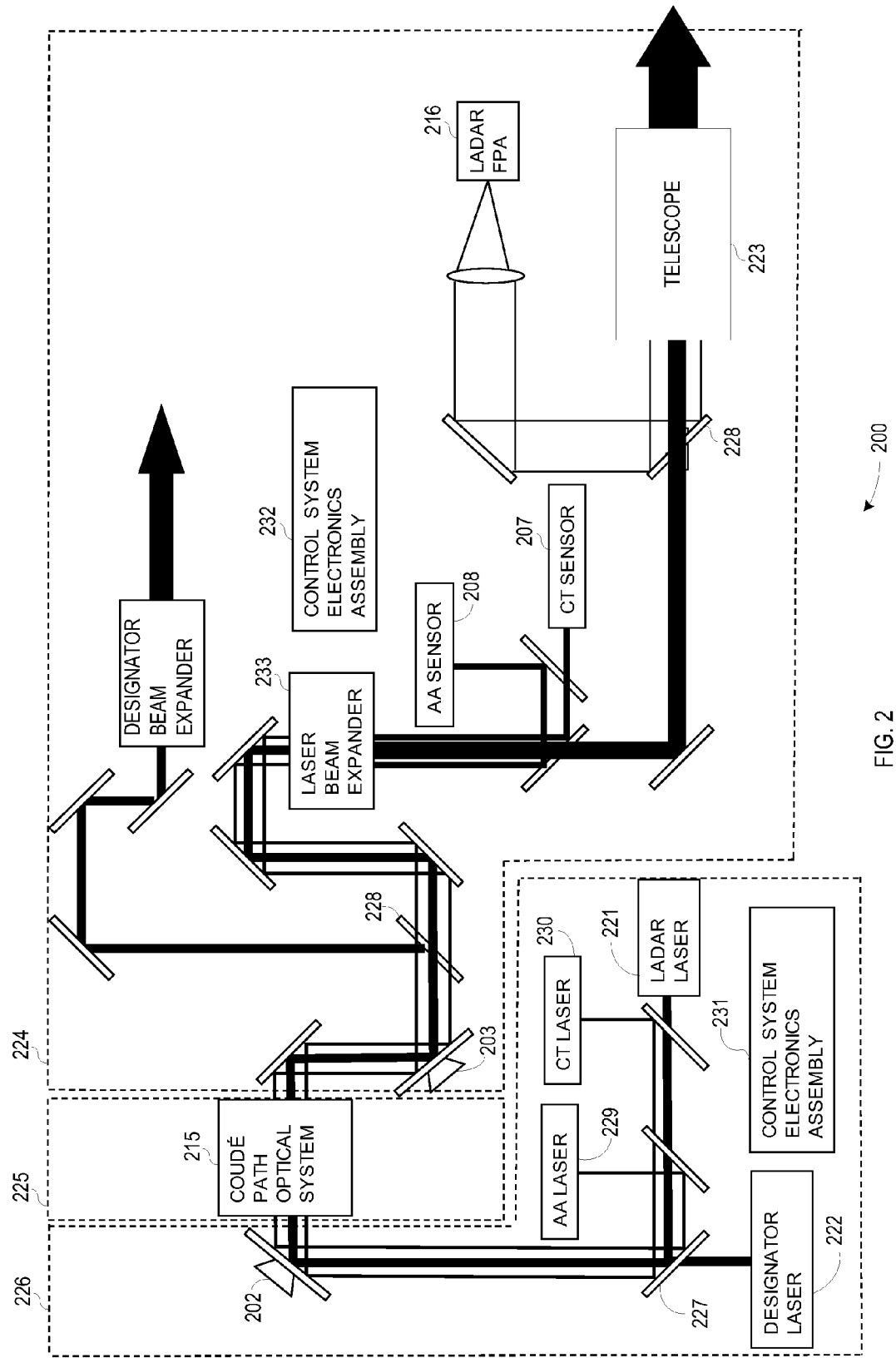
FIG. 2 illustrates generally an example gimbal-based laser projection system.

In certain examples, at least a portion of a laser projection system, either alone or combined with an imaging system, such as a target designation system, or range finding system, can be directed using an articulated support, such as a gimbal system. In such systems, the field of regard of the system can be substantially larger than the field of view. In some examples, the laser projection system can be used with mobile platforms such as land, airborne, space-based or water vehicles. In such systems, mechanical vibration and thermal variations can disrupt angular alignment and centration of the optical path of the laser projection system. FIG. 2 illustrates generally a gimbal-based laser projection system 200. The gimbal-based laser projection system 200 can include one or more mission lasers 221, 222, a centration (CT) sensor 207, a CT actuator 202, an auto-alignment (AA) sensor 208, an AA actuator 203, a coudé path optical system 215, and a telescope 223. In certain examples, a gimbal-based laser projection system 200 can be part of a larger system. For example, a gimbal-based laser projection system 200 can be associated with target imaging, target ranging and target designation systems. In certain examples, the gimbal-based laser projection system 200 can be associated with a focal plane array (FPA), such as a LADAR FPA 216. In general, FPAs can receive light, including ambient as well as reflected laser light, from the optical path of a system, such as light from the external field of view, and can convert the received light to electrical signals. The signals can be processed to provide, among other things, general image data, although the scope of the present examples is not limited in this respect.

In certain examples, the gimbal-based laser projection system 200 can include one or more gimbal assemblies 224, 225 to provide a larger field of regard compared to that of a fixed system. In an example, the gimbal-based laser projection system 200 can include an inner gimbal payload platform 224 and an intermediate gimbal assembly 225 supported by a gimbal base assembly 226. In an example, the gimbal base assembly 226 can include a land vehicle. In an example, the gimbal base assembly 226 can include an airborne vehicle. In an example, the gimbal base assembly 226 can include a space-based vehicle. In an example, the gimbal base assembly 226 can include a water based vehicle. In an example, a system can include more or fewer gimbal degrees of freedom than illustrated in the example of FIG. 2. For example, a gimbal system can include four angular degrees of freedom.

The gimbal assemblies 224, 225 can include a coudé path optical system 215 to pass the optical path between on-gimbal devices, such as devices on an inner gimbal payload platform, and off-gimbal devices, such as devices rigidly coupled to the gimbal base assembly. Coudé is the French word for elbow, suggesting an angled path. In an example, the coudé path optical system 215 can include a sequence of fold mirrors (FMs), each of which folds light about an angle. In certain examples, a coudé path optical system 215 can have a multiplicity of fold mirrors, too many to be depicted in a single FIGURE. In an example, in addition to purely reflective fold mirrors, the coudé path optical system 215 can include other reflective elements such as beam combiners (BCs) 227 and beam splitters (BSs) 228. In certain examples, the coudé path optical system 215 can include flat mirrors without optical power. In some examples, the coudé path optical system can include a focal, powered element such as a laser beam expander 233 in addition to flat mirrors.

A purpose of the coudé path optical system 215 can be to conduct light between one end of the optical path to the other in a very precise way. This can be nontrivial even when the structure supporting the laser projection system is nominally rigid. Precise control of the optical path can be more difficult when a supporting structure of the optical path is articulated. In particular, consider a case in which the optical path is supported by an articulated, multi-axis gimbal system that allows for motion of an inner gimbal payload platform 224 with respect to a gimbal base assembly 226. The gimbal system can complicate precise control of the optical path for several reasons. For example, due to the dynamic positioning available with a gimbal system, vibration control becomes more complicated than a nominally rigid system of the same size. Second, the gimbal axes can allow motion of optical path mirrors with respect to each other. Manufacturing imperfections of a gimbal system, such as gimbal bearing runout, thermal deformations, mechanical vibration, etc., can add additional complexity to the control of a gimbal system over a nominally rigid system of the same size.

In certain examples, the coudé path optical system 215 can conduct energy of one or more mission lasers 221, 222. Two examples of a mission laser can be a LADAR laser 221 and a target designator laser 222. Such lasers 221, 222 can project energy over large distances and can be large relative to the payload platform. In certain examples, the LADAR laser 221 or the target designator laser 222 can be associated with significant power and cooling resources. In such examples, it can be advantageous to mount one or more mission lasers 221, 222 on the gimbal base assembly 226, e.g., off-gimbal, instead of the inner gimbal payload platform 224, e.g. on-gimbal, supported by the one or more intermediate gimbal assemblies 225, where there can be more space and physical access, for example, for installation and maintenance of the lasers.

In an example, both angular alignment and centration of light propagating along an optical path, such as an optical path including an articulated coudé path, can be controlled. A control subsystem that controls angular alignment can be called an auto-alignment (AA) control system. A control subsystem that controls centration can be called a centration (CT) control system. Although the two control subsystems can be coupled optically, thus dynamically, the inventors have recognized that overall system control is well behaved when the subsystems operate independently.

In an example, the AA control system can include the AA actuator 203 and a AA sensor 208. The AA actuator 203 can include an actuated, two degrees-of-freedom (DOF) reflective system. In an example, the AA actuator 203 can include a single, fast steering mirror (FSM) with two DOF. In an example, the AA actuator 203 can include a pair of single-axis, actuated mirrors. In certain examples, the AA actuator 203 can include piezoelectric or electromagnetic actuators (e.g., voice-coil or galvanometer types).

In certain examples, the AA sensor 208 can measure the line-of-sight (LOS) angles of incident of reference light, such as collimated laser light. In an example, the AA sensor 208 can include a two-axis photodetector. In an example, the AA sensor 208 can include a focusing optic (lens system) that focuses collimated laser light on a sensor element. In certain examples, a small, clear aperture (similar to that of a pinhole camera) can be used to direct light on the AA sensor 208.

In certain examples, a source of laser light sensed by the AA sensor 208 can include a mission laser 221, 222. In other applications, a mission laser 221, 222 may not be suitable for control purposes. For example, a mission laser 221, 222 can be pulsed, with a low duty cycle. In some examples, a mission laser 221, 222 can be at a wavelength for which high bandwidth, low noise sensors are not available. In an example, operation of a mission laser 221, 222 may not coincide with desired operation of the AA control system.

For reasons such as those above, certain laser projection system examples can include a laser 229 dedicated to auto alignment in addition to one or more mission lasers 221, 222. In certain examples, an AA laser 229 can include a continuous wave (CW) laser or a pulsed laser with a high duty cycle and a high switching frequency relative to the AA control system bandwidth. In certain examples, output light of the AA laser 229 can be collimated.

In certain examples, the centration (CT) control system can include a CT actuator 202 and a CT sensor 207. The CT actuator 202 can include an actuated, two DOF reflective system. It is understood that the CT actuator 202 need not be of the same type or bandwidth as the AA actuator 203, but it can be. For example, the CT actuator 202 could be a low-bandwidth pair of galvanometer mirrors and the AA actuator 203 could be a high-bandwidth, two-axis, piezoelectric FSM.

In certain examples, the CT sensor 207 can measure the centration (lateral position) of an incident beam of light, such as, collimated laser light. In an example, the CT sensor 207 can include a two-axis photodetector. In certain examples, the CT sensor 207 can include powered optical elements (lenses or curved mirrors). In certain examples, the CT sensor 207 does not include powered optical elements. In certain examples, the source of laser light sensed by the CT sensor 207 can be a mission laser 221, 222. In some examples, the mission lasers 221, 222 may not be of an appropriate type for control, therefore the CT control system can include a CT laser 230. In certain examples, the output of the CT laser 230 can be collimated. In an example, the CT laser 230 can include a CW laser or a high duty cycle pulsed laser.

In certain examples, if the AA laser 229 and the CT laser 230 are near each other in the optical path, as shown in FIG. 2, then the gimbal-based laser projection system 200 can include a single laser for both centration and auto-alignment control.

In certain examples, the AA and CT actuators 203, 202 are well separated optically. In certain examples, the centration actuator 202 can be located towards the beginning of (optical) path, such as on the gimbal base assembly 226 and the AA actuator 203 can be located toward the end of the optical path, such as on the inner gimbal assembly 225. In certain examples, the opposite configuration is also possible, such that the AA actuator 203 is towards the beginning of the optical path and the centration actuator 202 is towards the end of the optical path.

In certain examples, the AA laser 229 and AA sensor 208 can be at opposite ends of the optical path. FIG. 2 illustrates generally an example an optical path with the AA laser 229 at (or near) the beginning of the optical path and the AA sensor 208 at (or near) the end of the optical path. In certain examples, the AA sensor 208 can be at the beginning of the optical path and the AA laser 229 can be at the end of the optical path.

In certain examples the CT laser 230 and CT sensor 207 can be at opposite ends of the optical path. FIG. 2 illustrates generally an example optical path with the CT laser 230 at (or near) the beginning of the optical path and the CT sensor 207 at (or near) the end of the optical path. In certain examples, the CT sensor 207 can be at the beginning of the optical path and the CT laser 230 can be at the end of the optical path.

In certain examples, a gimbal-based laser projection system 200 can include one or more control system electronics assemblies 231, 232. The control system electronics assemblies 231, 232 can include passive analog networks, active analog networks (e.g. op-amp circuits), and digital electronic networks. The digital electronic networks can include computational components such as field-programmable gate arrays, microprocessors, application-specific integrated circuits, etc.

In certain examples, a gimbal-based laser projection system 200 can include a LADAR focal plane array (FPA) 216 and a telescope 223. Optimal system operation can be obtained when the LADAR transmit laser 221 is aligned with respect to the telescope 223, the LADAR FPA 216 and other optical elements. Optimal target designation operation can be obtained when the designator laser 222 is aligned with the optical elements in the optical path. Centration control can avoid or reduce clipping of mission lasers 221, 222 at the many small apertures throughout the optical path. Also, some kinds of optical elements (e.g. some diffractive elements) are sensitive to centration of the mission lasers 221, 222.

With respect to the example illustrated in FIG. 2, it is understood that a laser projection system, whether fixed or articulated, can include additional optical components to combine optical paths, separate optical paths, shape optical paths, provide focusing as well as other optical functions.

Figure 3:
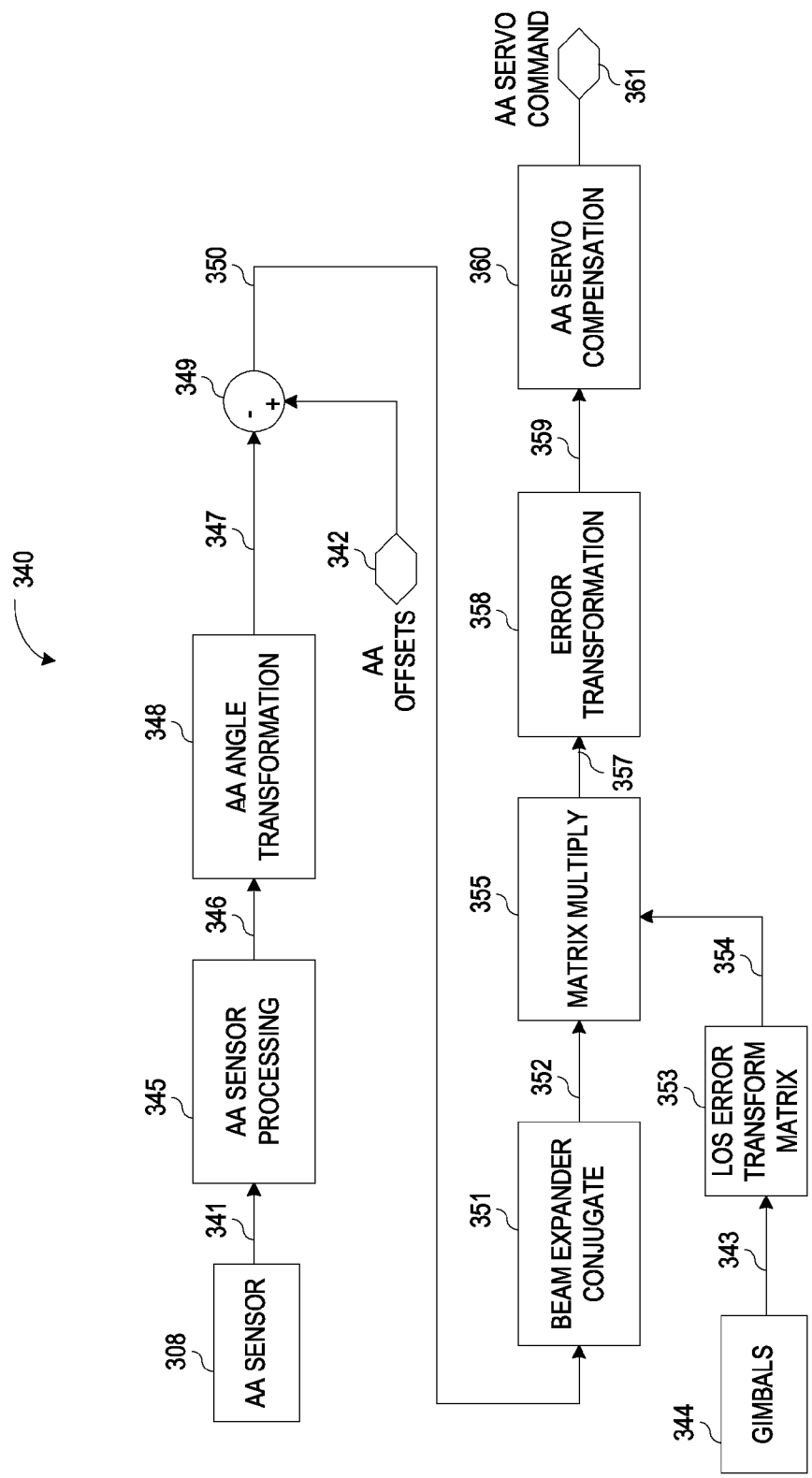
FIG. 3 illustrates generally an example auto-alignment (AA) processing path architecture.

FIG. 3 illustrates generally an example auto-alignment (AA) processing path 340 architecture. The AA processing path 340 can receive inputs including AA sensor measurements 341 from the AA sensor 308, AA line-of-sight (LOS) offsets 342, and gimbal positions 343 from one or more sensors of the gimbals 344. The AA sensor measurements 341 can include raw outputs of the AA sensor 308. For example, the AA sensor measurements 341 can include voltages proportional to photocurrents of the AA sensor 308. The AA processing path 340 can include an AA sensor processing module 345 to provide the AA sensor measurements 341 in AA LOS angles in sensor frame coordinates 346. In an example, AA LOS angles can correspond to (small) rotations of the AA laser LOS with respect to the nominal LOS. The reference axes of rotation of the AA LOS angles can be orthogonal and lie in a plane of the AA sensor 308. In an example, the AA LOS angles can be in sensor frame coordinates 346, e.g., the native coordinates of the AA sensor 308. For illustration assume that the units of the angles are radians.

In certain examples, the native coordinates and polarities of the AA sensor may not correspond with the coordinates desired by the control system designer. In some examples, the AA sensor 308 may not be ideally aligned or calibrated. In an example, the AA LOS angles in sensor frame coordinates 346 can be transformed to AA LOS angles in control frame coordinates 347 using an AA angle transformation module 348. Control frame coordinates can be arbitrary coordinates desired by the control system designer. In an example, the coordinate transformation can be achieved by multiplying the AA LOS angles in sensor frame coordinates 346 by a constant 2×2 matrix, $M_{AA\ SEN}^{AA\ CTL}$. The $M_{AA\ SEN}^{AA\ CTL}$ matrix can be nominally an orthogonal matrix (columns are unit vectors and perpendicular). In an example, if used for calibration purposes, the matrix need not be strictly orthogonal.

In certain examples, a goal of the AA processing path 340 architecture can be to null the outputs of the AA sensor 308. In certain examples, it can be useful to specify a pair of AA LOS angle offsets 342. The AA LOS angle offsets 342 can be slowly varying system inputs that can be used for overall system adjustment.

For illustration, assume that the units of these AA LOS angle offsets 342 are radians. The AA LOS angles in control frame coordinates 347 can be summed, at an AA summing node 349, with the AA LOS angle offsets 342 to generate an AA optical position error (OPE) in control frame coordinates 350. In an example, the AA OPE in control frame coordinates 350 can be a control system negative feedback error signal. In an example, a system can include an afocal beam expander in the optical path, such as the beam expander 233 element in FIG. 2. Let the entrance space of the beam expander 233 be the space at the beginning of the optical path, e.g., the space by the lasers 221, 222 in FIG. 2. Let the exit space be the space at the end of the optical path, for example, by the sensors 207, 208 in FIG. 2. Let the magnification of the (laser) beam expander 233 be $m_{BEX}$. This is the usual ratio of lateral ray displacements in an exit plane to lateral ray displacements in an optically conjugate entrance plane.

In an example, the AA OPE in control frame coordinates 350 can be defined on one side or the other side of the beam expander 233. In particular, the AA OPE in control frame coordinates 350 can be defined on the side (space) of the beam expander 233 containing the AA sensor 208. FIG. 2 suggests that the AA sensor 208 is on the exit side of the beam expander. A beam expander conjugate module 351 can provide an AA conjugate OPE in control frame coordinates in the vicinity of the beam expander 233. In this case, the AA conjugate OPE in control frame coordinates 352 can be equal to the AA OPE in control frame coordinates 350 times the beam expander magnification, $m_{BEX}$. In the event that there is no beam expander, the magnification $m_{BEX}$ can equal 1 and computing the AA conjugate OPE in control frame coordinates 352 can be moot.

In certain examples, an AA sensor 308 can be on the entrance side of the beam expander 233 and the AA actuator 203 can be on the exit side. In such an example, the AA conjugate OPE in control frame coordinates 352 can be equal to the AA OPE in control frame coordinates 350 times the inverse beam expander magnification, $$\frac{1}{m_{BEX}}.$$

In general, the AA conjugate OPE in control frame coordinates 352 can be derived by multiplying the AA OPE in control frame coordinates 350 by the beam expander magnification $m_{BEX}$ or its inverse, $$\frac{1}{m_{BEX}}.$$

For the example AA processing path 340, the AA conjugate OPE in control frame coordinates 352 provides a representative OPE in the vicinity of the beam expander 233. In certain examples, LOS errors of incident light that is reflected by various mirrors in the optical path have to be taken into account. Several factors can influence these errors including, but not limited to, the location and orientation of the various mirrors, the direction of the incident light and the definition of the LOS error frames chosen for the system. In some examples, angles of articulated joints of the optical path, such as gimbal angles, can also influence the LOS errors. In certain examples, the LOS errors are taken into account with a LOS error transformation matrix module 353 in the AA processing path 340. The LOS error transformation matrix module can include circuitry, software or a combination thereof, to take into account the various factor influencing the LOS errors the incident light associated with the AA optical path. The transformation can use a 2×2 transformation matrix $M_{AA\ CTL}^{AA}{}_{ACT}$. In certain examples, this matrix can depend on the gimbal angle measurements. The exact form of the transformation matrix can depend on the geometry of the gimbal system and the analysis frames chosen by the designer. In certain examples, the matrix can be the result of multiplying a number of 2×2 matrices, one for each mirror, for example. In certain examples, some matrices can have elements that vary (co-)sinusoidally as functions of a gimbal angle. If the AA actuator and sensor are on the same rigid body, with no articulation between them, then this matrix can be a constant. In certain examples, the LOS error transformation matrix module 353 can provide a transformation matrix 354 for computing LOS errors in actuator frame coordinates 357 given the LOS errors in control frame coordinates 352.

In an example, the AA processing path can include an AA matrix multiply module 355 to compute the AA OPE 357 in the vicinity of the AA actuator (FIG. 2, 203) in actuator frame coordinates, taking into account the articulated nature of the gimbals 344. To this end, the control system designer can define an LOS error frame in the vicinity of the actuator. In an example, the LOS error frame can be defined with respect to the rigid body to which the gimbals are mounted and can be referred to as the AA actuator frame.

In an example, the AA processing path 340 can include an error transformation module 358 to transform the AA conjugate OPE in actuator frame coordinates 357 to an AA mechanical position error 359 of the AA actuator 203. In certain examples, the AA conjugate OPE in actuator frame coordinates 357 can indicate an estimate of the optical position error (LOS angle error) in the vicinity of the AA actuator 203. In certain examples, the error transformation module 358 can include circuitry, software, or a combination thereof, to compute the mechanical position error in a set of coordinates appropriate for the AA actuator 203. In certain examples, the set of coordinates can be mirror gimbal angles or mirror inclination angles. In an example, the AA actuator 203 can have two mechanical DOF and thus, can have two independent mechanical angles or other generalized coordinates. Assuming small displacements, there can be a matrix to relate changes in mechanical angles to changes in LOS angles. This matrix can be referred to as the AA actuator optical gain matrix and denoted $G_{AA\ OP}$. In certain examples, this matrix can be a constant. The elements of the $G_{AA\ OP}$ matrix can depend on the choice of LOS frame, the geometry of the actuator mechanism, and the incidence geometry of the AA laser beam. The AA actuator optical gain matrix $G_{AA\ OP}$ can relate mechanical angles and LOS angles. Thus, an AA error transformation module 358, multiplying the LOS angular error (OPE) by $G_{AA\ OPT}^{-1}$, can provide a transformation of the OPE to mechanical angular error. $G_{AA\ OPT}^{-1}$ can denote the matrix inverse of $G_{AA\ OP}$. The result can be referred to as the AA mechanical position error (MPE) 359.

The MPE 359 can be used as the feedback error signal of the dynamic servo control system including the AA actuator 203. In certain examples, an AA servo compensation module 360 can be represented by a transfer function $G_{AA\ COMP}(S)$, where S is the Laplace variable. Details of the $G_{AA\ COMP}(S)$ compensator can depend on the particular actuator system and the specific design methodology. In certain examples, one might choose for each actuator axis a compensator of the form $$G_{AA\ COMP}(S) = K\frac{\tau_1 S + 1}{\tau_2 S + 1}\left(K_P + \frac{K_I}{S}\right).$$

In an example, this can be a lead compensator in cascade with a proportional plus integral controller, with appropriate choices of parameters. The lead compensator can be stabilizing and the proportional plus integral controller can act to eliminate steady state error.

This particular compensator is given solely as a representative example that will be well understood by control system designers. In certain examples, stabilization of the system is not required for actuators that are open-loop stable, such as piezoelectric systems.

In certain examples, outputs of an AA servo compensation module 360 can include a pair of AA servo commands 361 that can be sent to the AA actuator 203 via a driver such as a servo amplifier to move the AA actuator 203 to provide auto alignment of the optical path.

Figure 4:
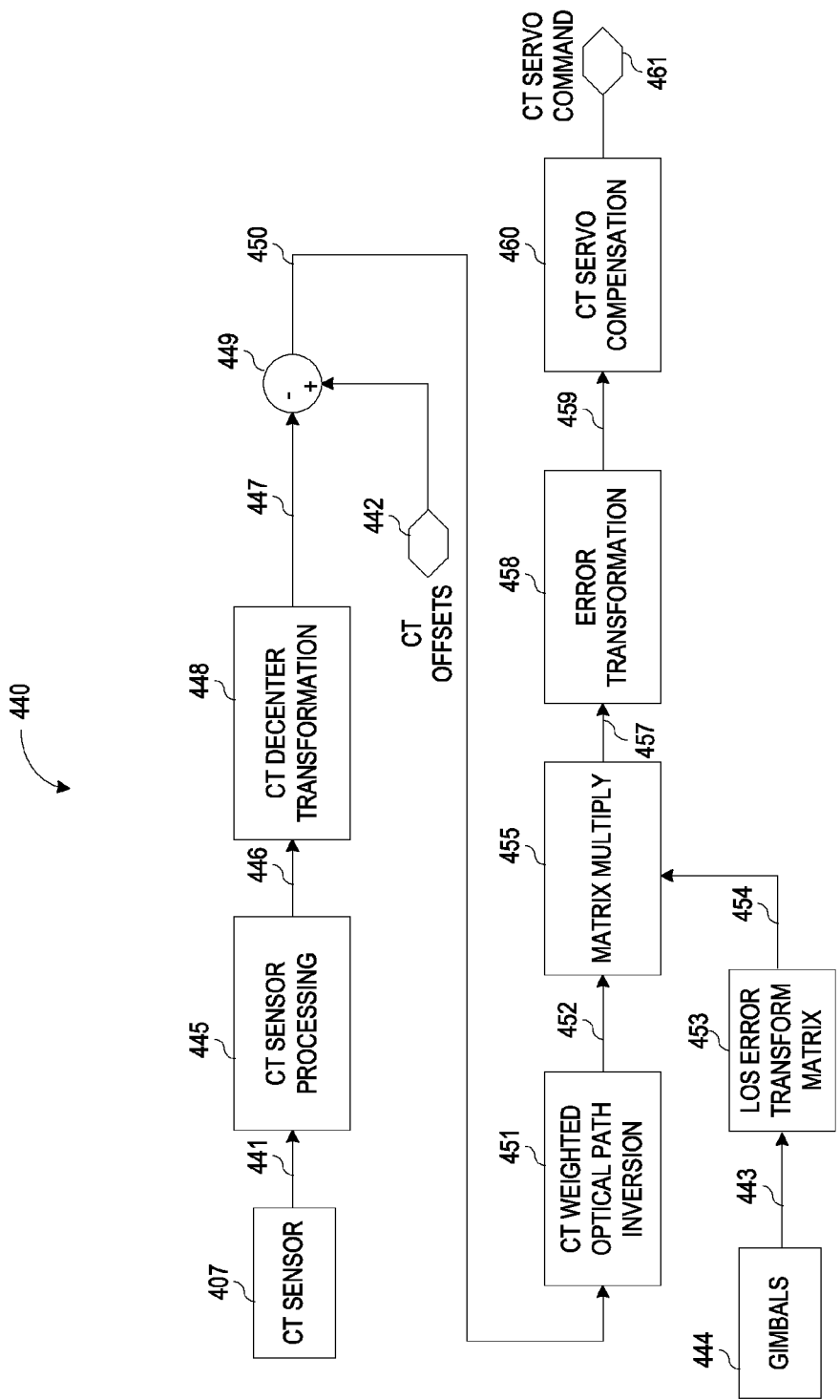
FIG. 4 illustrates generally an example centration (CT) processing path architecture.

FIG. 4 illustrates generally an example centration (CT) processing path 440 architecture. The CT processing path 440 can receive inputs including CT sensor measurements 441 from the CT sensor 407, CT line-of-sight (LOS) offsets 442, and gimbal positions 443 from one or more position sensors of the gimbals 444. In certain examples, the CT sensor measurements 441 can include raw outputs of the CT sensor 407. For example, the CT sensor measurements 441 can be voltages proportional to photocurrents of the CT sensor 407. The CT processing path 440 can include a CT sensor processing module 445 to process the CT sensor measurements 441. The CT sensor processing module 445 can include hardware, software, or combinations thereof. The CT sensor processing module 445 can provide CT decenters in sensor frame coordinates. In an example, the "CT decenters" can be lateral displacements of the center of a reference laser beam, such as a mission laser beam or a CT laser beam, with respect to a nominal beam center. The reference axes of displacement can be orthogonal and lie in the plane of the CT sensor 407. In certain examples, these displacements can be in sensor frame coordinates, such as the native coordinates of the CT sensor 407. In an example, the displacement coordinates can be a measure of distance such as meters.

In certain examples, the native coordinates and polarities of the CT sensor 407 may not correspond with the coordinates desired by the control system designer. In some examples, the CT sensor 407 may not be able to be ideally aligned or calibrated mechanically. For these or other reasons, an example CT processing path 440 can include a CT decenter transform module 448 to transform the CT decenters in sensor frame coordinates 446 to the CT decenters in control frame coordinates 447. In certain examples, the control frame coordinates can be the coordinates desired by the control system designer. The CT decenter coordinate transformation can be achieved by multiplying the decenters by a constant 2×2 matrix, $M_{AA\ SEN}^{AA\ CTL}$. This matrix can nominally be an orthogonal matrix (columns are unit vectors and perpendicular). In certain examples, the matrix may not be strictly orthogonal if used for calibration purposes.

In certain examples, a goal of the CT control system architecture can be to null the outputs of the CT sensor 407. In certain examples, it can be useful to specify a pair of CT decenter offsets 442. The CT decenter offsets 442 can be slowly varying system inputs that can be used for overall system adjustment.

The CT decenters in control frame coordinates 447 can be summed at a CT summing node 449 with the CT decenter offsets 442 to generate a CT decenter error in control frame coordinates 450. In an example, the CT decenter error 450 can be a CT processing path 440 negative feedback signal. In an example, a system can include an afocal beam expander in the optical path, such as the beam expander 233 in FIG. 2. As discussed above with respect to the AA control system, let the magnification of the (laser) beam expander be $m_{BEX}$.

In an example, the CT decenter error in control frame coordinates 450 can be defined on one side or the other side of the beam expander 233. In particular, the CT decenter error can be defined on the side (space) of the beam expander containing the CT sensor 407. FIG. 2 suggests that the CT sensor 207 is on the exit side of the beam expander 233 and that the CT actuator 202 is on the entrance side. In this case, a weighted optical path length (WOPL) can be defined. The optical path length $OPL_i$ of an optical path within a space with index of refraction $n_i$ is $OPL_i = n_i L_i$, where $L_i$ is the usual Euclidean length of the path. For a path through a sequence of spaces with different indices of refraction, the optical path length of the entire space can be equal to the sum of the optical path lengths of the homogeneous spaces. In an example, Let $OPL_{Si}^{Sj}$ denote the optical path length from surface $S_i$ to surface $S_j$. Assuming the CT sensor 207 is on the exit side of the beam expander, the weighted optical path length from the CT actuator 202 to the CT sensor 207 can be defined as, $$WOPL_{CT\ ACT} = m_{LBE} OPL_{CT\ SEN}^{LBE\ ENTRANCE} + m_{LBE}^{-1} OPL_{LBE\ EXIT}^{CT\ SEN}$$

Where LBE ENTRANCE and LBE EXIT are conjugate reference planes in the vicinity of the beam expander 233.

In an example, where the CT sensor 207 is on the entrance side (space) of the beam expander 233 and the CT actuator 202 is on the exit side, the weighted optical path length from the CT actuator 202 to the CT sensor 207 can be defined as, $$WOPL_{CT\ ACT} = m_{LBE}^{-1} OPL_{CT\ SEN}^{LBE\ EXIT} + m_{LBE} OPL_{LBE\ ENTRANCE}^{CT\ SEN}$$

In either case, the CT optical position error (OPE) in control frame coordinates 452 in the vicinity of the beam expander can be equal to the CT OPE in control frame coordinates 450 times the inverse weighted optical path length, $WOPL_{CT\ ACT}^{-1}$. In an example, the CT processing path can include a CT weighted optical path inversion module 451 to provide the CT optical position error (OPE) in control frame coordinates 452 in the vicinity of the beam expander 233.

In certain examples, LOS errors of incident light that is reflected by various mirrors in the optical path have to be taken into account. Several factors can influence these errors including, but not limited to, the location and orientation of the various mirrors, the direction of the incident light and the definition of the LOS error frames chosen for the system. In some examples, angles of articulated joints of the optical path, such as gimbal angles, can also influence the LOS errors. In certain examples, the LOS errors are taken into account with an LOS error transformation matrix module 453 in the CT processing path. The LOS error transformation matrix module 453 can include circuitry, software or a combination thereof, to take into account the various factor influencing the LOS errors of the incident light associated with the CT optical path. The transformation of coordinates to account for the gimbals can use a 2×2 transformation matrix $M_{CT\ CTL}^{CT\ ACT}$. In certain examples, the matrix $M_{CT\ CTL}^{CT\ ACT}$ matrix depends on the gimbal angle measurements. The exact form of the transformation matrix can depend on the geometry of the gimbal system and the analysis frames chosen by the designer. In certain examples, the $M_{CT\ CTL}^{CT\ ACT}$ matrix can be the result of multiplying a number of 2×2 matrices, one for each mirror in the optical path, for example. In certain examples, some of the matrices can have elements that vary (co-)sinusoidally as functions of a gimbal angle. In certain examples, if the CT actuator and sensor are on the same rigid body, with no articulation between them, then this matrix is a constant. In certain examples, the LOS error transformation matrix module 453 can provide a transformation matrix 454 for computing LOS errors in actuator frame coordinates 457 given the LOS errors in control frame coordinates 452.

In certain examples, the CT processing path 440 can include a matrix multiply module 455 to compute the CT OPE in actuator control frame coordinates 457 in the vicinity of the CT actuator (FIG. 2, 202), taking into account the articulated nature of the gimbals 444. To this end, the control system designer can define an LOS error frame in the vicinity of the CT actuator. This frame can be defined with respect to the rigid body to which the CT actuator is mounted. This frame can be referred to as the CT actuator frame.

In an example, the CT processing path 440 can include a CT error transformation module 458 to transform the CT OPE in actuator control frame coordinates 457 to a mechanical position error 459 of the centration actuator 202. In certain examples, the CT OPE in actuator frame coordinates 457 can indicate an estimate of the optical position error (LOS angle error) in the vicinity of the CT actuator 202. In certain examples, the CT error transform module 458 can include circuitry, software, or a combination thereof, to compute a mechanical position error in a set of coordinates appropriate for the CT actuator 202. In certain examples, the set of coordinates can be mirror gimbal angles or mirror inclination angles. In an example, the CT actuator 202 can have two mechanical DOF and thus, can have two independent mechanical angles or other generalized coordinates. Assuming small displacements, there is a matrix to relate changes in mechanical angles to changes in LOS angles. This matrix can be referred to as the CT actuator optical gain matrix and denoted $G_{CT\ OP}$. In certain examples, this matrix can be a constant. The elements of the denoted $G_{CT\ OP}$ matrix can depend on the choice of LOS frame, the geometry of the actuator mechanism, and the incidence geometry of the CT laser beam. The CT actuator optical gain matrix $G_{CT\ OP}$ can relate mechanical angles and LOS angles. Thus, the CT error transformation module 458 can multiply the CT LOS angular error (OPE) 247 by $G_{CT\ OPT}^{-1}$ to provide a transformation of the CT OPE to mechanical angular error. The result can be referred to as the CT mechanical position error (MPE) 459.

The CT MPE 459 can be used as the feedback error signal of a servo control system including the CT actuator 202. In certain examples, a CT servo dynamic compensation module 460 can be represented by a transfer function $G_{CT\ COMP}(S)$. Details of the $G_{CT\ COMP}(S)$ compensator can depend on the particular actuator system and the specific system design methodology. In certain examples, one might choose for each axis a compensator of the form $$G_{CT\ COMP}(S) = K \frac{\tau_1 S + 1}{\tau_2 S + 1} \left( K_P + \frac{K_I}{S} \right)$$

In an example, this can be a lead compensator in cascade with a proportional plus integral controller, with appropriate choices of parameter. The lead compensator can be stabilizing and the proportional plus integral controller can act to eliminate steady state error.

This particular CT compensator is given solely as a representative example that will be well understood by control system designers.

In certain examples, outputs of the CT servo dynamic compensation module 460 can include a pair of CT servo compensation commands that can be coupled to a CT actuator 202 via a driver, such as a servo amplifier, to position the CT actuator 202 to provide centration control of the mission lasers.

As described above, in certain examples, the processing paths of the AA and CT control systems are separate control loops, and can operate simultaneously or individually.

In certain examples, a laser projection system can include a gimbal processor, such as an embedded processor, to control or monitor the position of the gimbals. In certain examples, processors associated with the alignment and centration control systems can receive gimbal information, such as gimbal position, from the gimbal processor.

In certain examples, the latencies in processing and communications can be different between the centration processing path and the alignment processing path. In certain examples, one of the alignment processing path or the centration processing path can operate at a significantly lower bandwidth then the other processing path.

In an example, a laser projection system can provide alignment responses of about 1.1 micro-radians ($\mu$rad) and 1.6 $\mu$rad at 1-$\sigma$ for a 60 Hz alignment disturbance of about 136 $\mu$rad and 104 $\mu$rad at 1-$\sigma$. In an example, a system can provide centration responses of about 26.5 micrometers ($\mu$m) and 18.2 $\mu$m at 1-$\sigma$, for 60 Hz centration disturbances of about 233 $\mu$m and 150 $\mu$m at 1-$\sigma$. In an example, the centration control system can have a bandwidth of about 300 Hz and the alignment control system can have a bandwidth of about 4 kHz.

ADDITIONAL NOTES & EXAMPLES

In Example 1, a laser projection system can include an alignment stabilization system configured to align an optical path to a reference, the alignment stabilization system having an alignment stabilization processing path configured to receive alignment information from an alignment sensor, a centration stabilization system configured to center the optical path within an aperture, the centration stabilization system having a centration stabilization processing path configured to receive centration information from a centration sensor, and an articulated system configured to support at least a portion of at least one of the alignment stabilization system or the centration stabilization system.

In Example 2, the alignment stabilization system of Example 1 optionally includes an alignment emission source, the alignment sensor to detect an emission of the alignment emission source and to provide the alignment information using the detected alignment emission, an alignment actuator configured to direct the emission of the alignment emission source, and an alignment processor including the alignment stabilization processing path, the alignment stabilization processing path configured to receive the alignment information from the alignment sensor, to process the alignment information, and to provide alignment reference information to adjust the alignment actuator to compensate for an alignment disturbance.

In Example 3, the centration stabilization system of any one or more of claims 1 and 2 optionally includes a centration emission source, the centration sensor to detect an emission of the centration emission source and to provide the centration information using the detected centration emission, a centration actuator configured to direct the emission of the centration emission source, and a centration processor including the centration stabilization processing path, the centration stabilization processing path configured to receive the centration information from the centration sensor, to process the centration information, and to provide centration reference information to the centration actuator to compensate for a centration disturbance.

In Example 4, the alignment emission source of any one or more of Examples 1-3 optionally includes an off-gimbal alignment emission source.

In Example 5, the alignment emission source of any one or more of Examples 1-3 optionally includes an on-gimbal alignment emission source.

In Example 6, the alignment sensor of any one or more of Examples 1-5 optionally includes an on-gimbal alignment sensor.

In Example 7, the alignment sensor of any one or more of Examples 1-5 optionally includes an off-gimbal alignment sensor.

In Example 8, the alignment actuator of any one or more of Examples 1-7 optionally includes an on-gimbal alignment actuator.

In Example 9, the alignment actuator of any one or more of Examples 1-7 optionally includes an off-gimbal alignment actuator.

In Example 10, the centration emission source of any one or more of Examples 1-9 optionally includes an off-gimbal centration emission source.

In Example 11, the centration emission source of any one or more of Examples 1-9 optionally includes an on-gimbal centration emission source.

In Example 12, the centration sensor of any one or more of Examples 1-11 optionally includes an on-gimbal centration sensor.

In Example 13, the centration sensor of any one or more of Examples 1-11 optionally includes an off-gimbal centration sensor.

In Example 14, the centration actuator of any one or more of Examples 1-13 optionally includes an on-gimbal centration actuator.

In Example 15, the centration actuator of any one or more of Examples 1-13 optionally includes an off-gimbal centration actuator.

In Example 16, the alignment emission source of any one or more of Examples 1-15 and the centration emission source of any one or more of Examples 1-15 optionally include a single laser.

In Example 17, the alignment processor of any one or more of Examples 1-16 optionally includes a first field programmable gate array and the centration processor of any one or more of Examples 1-16 optionally includes a second field programmable gate array.

In Example 18, the alignment processor of any one or more of Examples 1-7 is optionally configured to operate with a higher control bandwidth than a control bandwidth of the centration processor.

In Example 19, the centration processor of any one or more of Examples 1-17 is optionally configured to operate with a higher control bandwidth than a control bandwidth of the alignment processor.

In Example 20, the alignment processor of any one or more of Examples 1-17 is optionally configured to operate with a control bandwidth that is more than 10 times higher than a control bandwidth of the centration processor.

In Example 21, the centration processor of any one or more of Examples 1-7 is optionally configured to operate with a control bandwidth that is more than 10 times higher than a control bandwidth of the alignment processor.

In Example 22, the alignment stabilization processing path of any one or more of Examples 1-21 is optionally separate from the centration stabilization processing path.

In Example 23, the a laser projection system optionally includes a power control loop configured to receive power information from at least one of the centration sensor or the alignment sensor, to compare the power information to a target power level, and to modulate a control signal of an emission source associated with at least one of the centration sensor or the alignment sensor using the comparison.

Example 24 can include, or can optionally be combined with any portion or combination of any portions of any one or more of Examples 1-23 to include, subject matter that can include means for performing any one or more of the functions of Examples 1-23, or a machine-readable medium including instructions that, when performed by a machine, cause the machine to perform any one or more of the functions of Examples 1-23.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of legal equivalents to which such claims are entitled.

The claimed invention is:

1. A laser projection system comprising:
    an alignment stabilization system configured to align an optical path to a reference, the alignment stabilization system having an alignment stabilization processing path configured to receive alignment information from an alignment sensor;
    a centration stabilization system configured to center the optical path within an aperture, the centration stabilization system having a centration stabilization processing path configured to receive centration information from a centration sensor, and
    an articulated system configured to support at least a portion of at least one of the alignment stabilization system or the centration stabilization system.

2. The laser projection system of claim 1, wherein the alignment stabilization system includes:
    an alignment emission source;
    the alignment sensor to detect an emission of the alignment emission source and to provide the alignment information using the detected alignment emission;
    an alignment actuator configured to direct the emission of the alignment emission source; and
    an alignment processor including the alignment stabilization processing path, the alignment stabilization processing path configured to receive the alignment information from the alignment sensor, to process the alignment information, and to provide alignment reference information to adjust the alignment actuator to compensate for an alignment disturbance.

3. The laser projection system of claim 2, wherein the centration stabilization system includes:
    a centration emission source;
    the centration sensor to detect an emission of the centration emission source and to provide the centration information using the detected centration emission;
    a centration actuator configured to direct the emission of the centration emission source; and
    a centration processor including the centration stabilization processing path, the centration stabilization processing path configured to receive the centration information from the centration sensor, to process the centration information, and to provide centration reference information to the centration actuator to compensate for a centration disturbance.

4. The system of claim 2, wherein the alignment emission source includes an off-gimbal alignment emission source.

5. The system of claim 2, wherein the alignment emission source includes an on-gimbal alignment emission source.

6. The system of claim 1, wherein the alignment sensor includes an on-gimbal alignment sensor.

7. The system of claim 1, wherein the alignment sensor includes an off-gimbal alignment sensor.

8. The system of claim 1, wherein the alignment actuator includes an on-gimbal alignment actuator.

9. The system of claim 1, wherein the alignment actuator includes an off-gimbal alignment actuator.

10. The system of claim 3, wherein the centration emission source includes an off-gimbal centration emission source.

11. The system of claim 3, wherein the centration emission source includes an on-gimbal centration emission source.

12. The system of claim 1, wherein the centration sensor includes an on-gimbal centration sensor.

13. The system of claim 1, wherein the centration sensor includes an off-gimbal centration sensor.

14. The system of claim 1, wherein the centration actuator includes an on-gimbal centration actuator.

15. The system of claim 1, wherein the centration actuator includes an off-gimbal centration actuator.

16. The system of claim 3, wherein the alignment emission source and the centration emission source include a single laser.

17. The system of claim 1, wherein the alignment processor includes a first field programmable gate array and the centration processor includes a second field programmable gate array.

18. The system of claim 1, wherein the alignment processor is configured to operate with a higher control bandwidth than a control bandwidth of the centration processor.

19. The system of claim 1, wherein the centration processor is configured to operate with a higher control bandwidth than a control bandwidth of the alignment processor.

20. The system of claim 1, wherein the alignment processor is configured to operate with a control bandwidth that is more than 10 times higher than a control bandwidth of the centration processor.

21. The system of claim 1, wherein the centration processor is configured to operate with a control bandwidth that is more than 10 times higher than a control bandwidth of the alignment processor.

22. The system of claim 1, wherein the alignment stabilization processing path is separate from the centration stabilization processing path.

23. The system of claim 1, including a power control loop configured to receive power information from at least one of the centration sensor or the alignment sensor, to compare the power information to a target power level, and to modulate a control signal of an emission source associated with at least one of the centration sensor or the alignment sensor using the comparison.

* * * * *

UNITED STATES PATENT AND TRADEMARK OFFICE
CERTIFICATE OF CORRECTION

PATENT NO. : 8,531,657 B2  
APPLICATION NO. : 13/233225  
DATED : September 10, 2013  
INVENTOR(S) : Fasse et al.

Page 1 of 1

It is certified that error appears in the above-identified patent and that said Letters Patent is hereby corrected as shown below:

In the Specification

In column 6, line 58, delete "FIGURE" and insert --figure--, therefor

In column 10, line 65-66, delete "$M_{AA\,CTL}^{AA\,ACT}$." and insert --$M_{AA\,CTL}^{AA\,ACT}$.--, therefor In column 12, line 49, delete "$M_{AA\,SEN}^{AA\,CTL}$" and insert --$M_{CTSEN}^{CT\,CTL}$--, therefor In column 13, line 20-21, delete "$4\;\;WOPL_{CT\,ACT}=m_{LBE}OPL_{CT\,SEN}^{LBE\,ENTRANCE}+m_{LBE}^{-1}OPL_{LBE\,EXIT}^{CT\,SEN}$" and insert --$WOPL_{CT\,ACT}=m_{LBE}OPL_{CT\,ACT}^{LBE\,ENTRANCE}+m_{LBE}^{-1}OPL_{LBE\,EXIT}^{CT\,SEN}$--, therefor In column 15, line 16, delete "then" and insert --than--, therefor In the Claims In column 18, line 38, in Claim 1, delete "sensor" and insert --sensor;--, therefor Signed and Sealed this  
Eighteenth Day of November, 2014

Michelle K. Lee  
*Deputy Director of the United States Patent and Trademark Office*